United States Patent
Floyd et al.

(10) Patent No.: US 7,996,703 B2
(45) Date of Patent: Aug. 9, 2011

(54) METHOD AND APPARATUS TO AVOID POWER TRANSIENTS DURING A MICROPROCESSOR TEST

(75) Inventors: Michael Stephen Floyd, Cedar Park, TX (US); Norman Karl James, Liberty Hill, TX (US); Jeffrey William Kellington, Pflugerville, TX (US); Larry S. Leitner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/023,550

(22) Filed: Jan. 31, 2008

(65) Prior Publication Data

US 2009/0199027 A1 Aug. 6, 2009

(51) Int. Cl.
*G06F 1/04* (2006.01)
*G06F 1/14* (2006.01)

(52) U.S. Cl. .......... 713/502; 713/500; 713/501; 712/40; 712/244

(58) Field of Classification Search .................. 713/500, 713/501, 502; 712/40, 244
See application file for complete search history.

(56) References Cited

U.S. PATENT DOCUMENTS

| | | | |
|---|---|---|---|
| 5,400,341 A * | 3/1995 | Makino et al. ................ | 713/340 |
| 5,710,508 A | 1/1998 | Watanabe | |
| 5,740,296 A * | 4/1998 | Harris ........................... | 385/116 |
| 5,881,296 A * | 3/1999 | Williams et al. .............. | 710/263 |
| 6,326,669 B1 | 12/2001 | Hwang et al. | |
| 6,385,274 B1 | 5/2002 | Nohara | |
| 6,657,837 B1 | 12/2003 | Morris et al. | |
| 2007/0192636 A1* | 8/2007 | Gonzalez et al. ............. | 713/300 |
| 2007/0204085 A1* | 8/2007 | Orlando et al. ............... | 710/261 |

* cited by examiner

*Primary Examiner* — Thomas Lee
*Assistant Examiner* — Michael J Brown
(74) *Attorney, Agent, or Firm* — Yee & Associates, P.C.; Thomas E. Tyson

(57) ABSTRACT

Exemplary embodiments provide a computer-implemented method and a system for a startup cycle for a cycle deterministic start. An initializing mechanism applies power to a microprocessor. The initializing mechanism initializes the configuration of the microprocessor. The initializing mechanism initializes a timer. The initializing mechanism then sends a clock start command to the microprocessor. The clocks on the microprocessor are started. Upon the clocks starting, the timer begins and allows temporary transients, such as voltage droop due to a large instantaneous change in demand for current due to the commencement of clock switching. Responsive to the timer reaching a target value, an interrupt unit sends a system reset interrupt. Responsive to the interrupt unit sending the system reset interrupt, an instruction fetch unit fetches a first instruction. This operation will be deterministic to the state of the rest of the microprocessor memory elements (latches, arrays, et al.).

14 Claims, 4 Drawing Sheets

METHOD AND APPARATUS TO AVOID POWER TRANSIENTS DURING A MICROPROCESSOR TEST

BACKGROUND

1. Field of the Invention

The present application relates generally to microprocessors. More specifically, the present application provides a method for avoiding initial power transients.

2. Description of the Related Art

A special "boot" or initialization sequence occurs after applying power to a microprocessor chip in a computer, in order to load the initial program code and start the microprocessors executing that program. In some computer systems, the microprocessor core initializes to a quiesced or stopped state, relying on a service element or another microprocessor to issue a system restart (or start command) in order to start instructions once the program is loaded. A service element is usually a small microcontroller that has the job of initializing and booting up the data processing system. In larger data processing systems, service elements also monitor for errors in the systems or monitor power or temperature, and so forth. Microcontrollers are single purpose processing units designed to execute small control programs, sometimes in real time. The program is frequently stored on the microcontroller in an area of nonvolatile memory. In some instances, the microprocessor is self-initializing, and the microprocessor itself issues the start command.

Additionally, the hardware, upon wake-up from power savings mode, such as sleep, must issue a system restart (or start command) to resume execution. This wake-up procedure can look very much like the clock and instruction start after system initialization.

It is often desirable, when performing test and debug of a microprocessor, to perform a cycle deterministic start. A cycle deterministic start means that, when repeating a test, the hardware executes in exactly the same way every time. Since the service element is asynchronous to the microprocessor, there is no way to guarantee that the traditional instruction start command occurs with the processor in the same exact state every time. Reproducing the same bug scenario every time a test is run is the biggest challenge in debugging problems in a design. Having the ability to deterministically reproduce the failure greatly decreases the time required from failure observation to discovering the fix. This type of debugging is very important in getting systems using the computer chip to market as fast as possible.

Traditionally, to force deterministic operation, the user initializes the microprocessor core by setting a system reset (sreset) interrupt pending, by using a scan, for example, with the functional clocks off. In a scan mode, the service element, which connects to a microprocessor via a JTAG port, is able to set all the latches in all the elements in a processor core to a desired state or setting. JTAG stands for the Joint Test Action Group, which is a standard specifying how to control and monitor the pins of compliant devices on a printed circuit board. Clocks are an integral part of circuits. Clocks allow latches to hold or maintain state. Thus, all the latches connect to clocks.

When all of the clocks on a microprocessor start coincidently, a sequencer sees the sreset interrupt immediately, which causes the instruction fetch unit to fetch the first instruction. During this time, a voltage droop occurs from both an increase in clock power demand and the switching of latch state caused by the instruction execution. The sudden increase in current demand, which the power supplying circuits have not seen yet, causes a voltage droop. Voltage droop is a short-term temporary reduction in the voltage level experienced by electronic devices as they create a load on the power supply. The greater the change in demand for electric current by a device, or by nearby devices, the larger and steeper the drop in voltage experienced. This drop in voltage is undesirable since the performance of electronic devices degrades at lower voltages resulting in loss of performance and potentially incorrect operation.

The unrealistic condition caused by this voltage droop may cause test case fails to occur often when doing chip characterization and testing. Thus, there is a need for an improved method of resetting a system to avoid the initial power transient.

SUMMARY

Exemplary embodiments provide a computer-implemented method and a system for a startup cycle for a cycle deterministic start. An initializing mechanism applies power to a microprocessor. The initializing mechanism initializes the configuration of the microprocessor. The initializing mechanism initializes a timer. The initializing mechanism then sends a clock start command to the microprocessor. Clocks on the microprocessor start. Responsive to the timer reaching a target value, an interrupt unit sends a system reset interrupt. Responsive to the interrupt unit sending the system reset interrupt, an instruction fetch unit fetches a first instruction.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
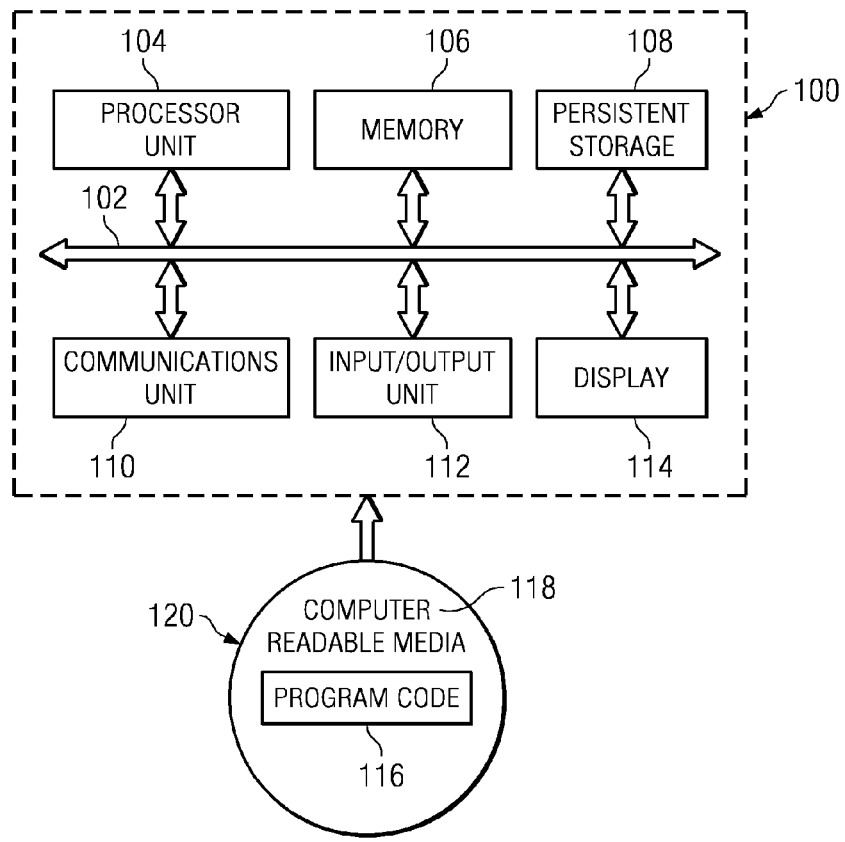
FIG. 1 is a block diagram of a data processing system in accordance with an illustrative embodiment of the present invention.

Turning now to FIG. 1, FIG. 1 depicts a block diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications using either or both physical and wireless communications links.

Input/output unit 112 allows for input and output of data with other devices that may connect to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer-implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108, and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
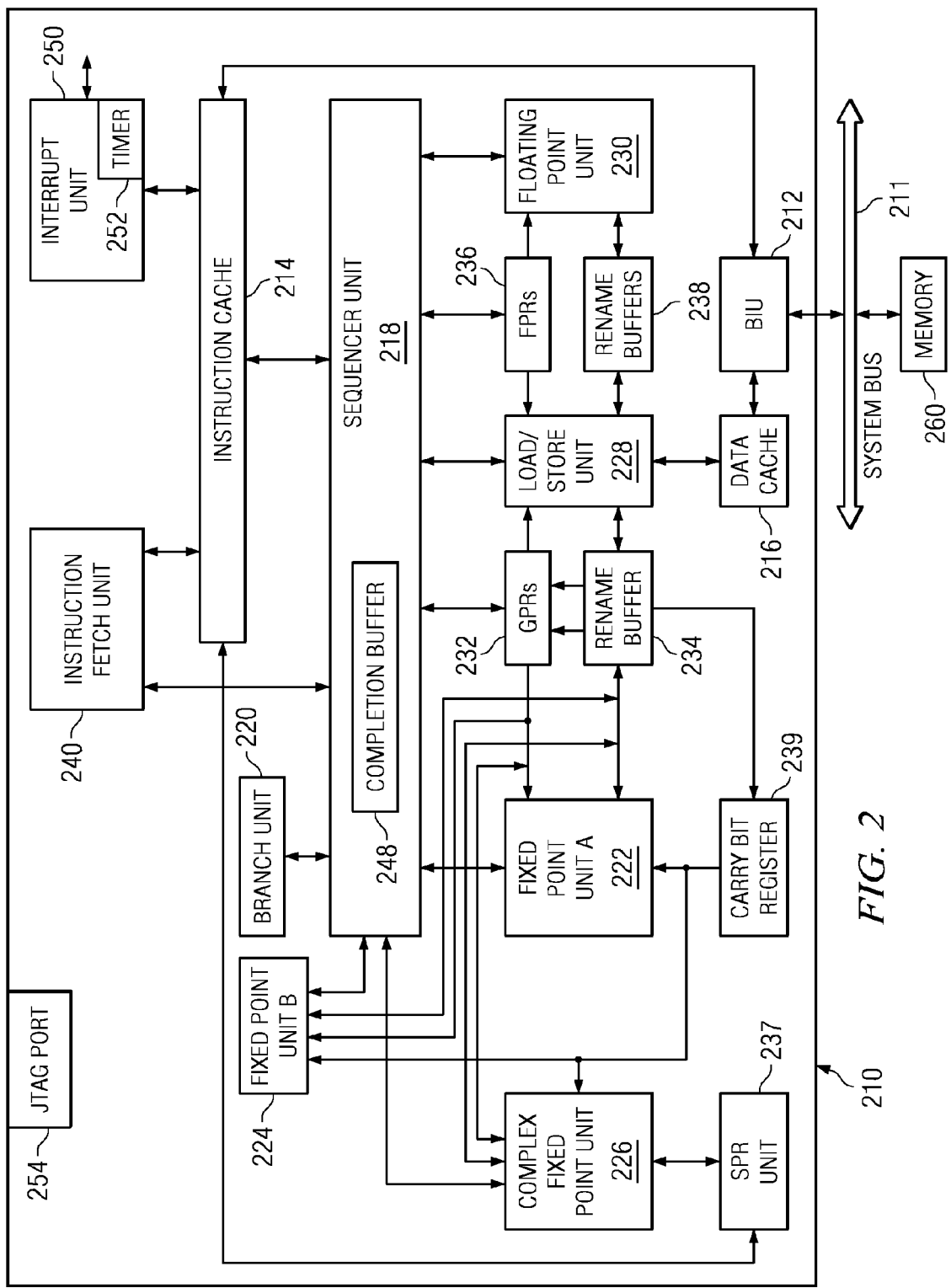
FIG. 2 is a block diagram of a processor system for processing information in accordance with a preferred embodiment of the present invention.

Turning next to FIG. 2, a block diagram of a processor system for processing information is depicted in accordance with a preferred embodiment of the present invention. Processor 210 may be implemented as processor unit 104 in FIG. 1.

In an exemplary embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an exemplary embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in an exemplary embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

As information is stored at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Completion buffer 248 is provided within sequencer unit 218 to track the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210.

Voltage noise on a microprocessor comprises three basic components. The first component comes from the initial spike to the noise from applying power to the microprocessor. The second component comes from a large power spike from initially starting the clocks. The third component is constant noise from the microprocessor executing instructions. Historically, during a cycle repeatable run, the second and third noise components happen at the same time. Added together these two components can potentially cause a very large power spike that can lead to array cells and latches losing their values.

Exemplary embodiments provide for delaying the constant noise component from the executing instructions by using a timer to "wait out" the initial power transient caused by starting the clocks, which is the second component of the noise. In an exemplary embodiment, a special hardware timer delays the issuance of the initial system reset interrupt. In an alternate exemplary embodiment, the power saving state machine delays the issuance of the initial system reset interrupt.

Exemplary embodiments employ an existing timer, such as a timer within an interrupt unit, such as timer 252 of interrupt unit 250 in FIG. 2, to delay the starting of fetching instructions. However, in other illustrative embodiments, this timer may reside on the processor but separate from the interrupt unit or the timer may reside completely off the microprocessor. An initializing mechanism initializes the timer to a time long enough for the power supply to see the drop in voltage due to clock start and respond to the new power need. An initializing mechanism scans the processor to determine a time value sufficient to allow a power supply to respond to a drop in voltage from starting clocks on the microprocessor. The initializing mechanism uses this time value in initializing the timer. The timer either counts upward from a number until reaching a target value or counts downward from a number until the timer reaches the target value. The target value is a value equal to the initialized value plus the determined value, in the case of counting upward with the timer, or the initialized value minus the determined value, in the case of decrementing the timer. Comparing against zero takes less logic than comparing against a number.

In an alternative exemplary embodiment, the hardware sets the time when coming out of sleep mode. The hardware has a mode such that when the timer expires, the interrupt unit causes a system reset interrupt that initiates the first instruction fetch after the power transient has settled.

Thus, exemplary embodiments provide a new startup sequence for cycle reproducibility. The sequence starts by an initializing mechanism applying power to the microprocessor. The initializing mechanism scans the initial state of the microprocessor and sets a timer. The timer sends a system reset interrupt when the timer reaches a target value. The initializing mechanism sends a clock start command. As a result, the clocks turn on immediately and the timer starts. When the timer reaches a target value, the microprocessor begins to fetch instructions, thus avoiding the power transient.

In an alternate exemplary embodiment, the sequence also starts by an initializing mechanism applying power to the microprocessor. The initializing mechanism scans the microprocessor into a sleep state, in which a sleep timer, or other interrupt, wakes the processor up. The initializing mechanism sends a start clock command. As a result, the global clocks turn on. Depending on the power save state, local clocks may delay turning on. Global clocks include those clocks not on the microprocessor and may include some clocks on the processor. For example, the clocks in instruction cache 214 and data cache 216 of FIG. 2 are global clocks, as they keep the system in sync. The microprocessor wakes up and starts fetching instructions via a timer in a gradual and cycle accurate manner.

Figure 3:
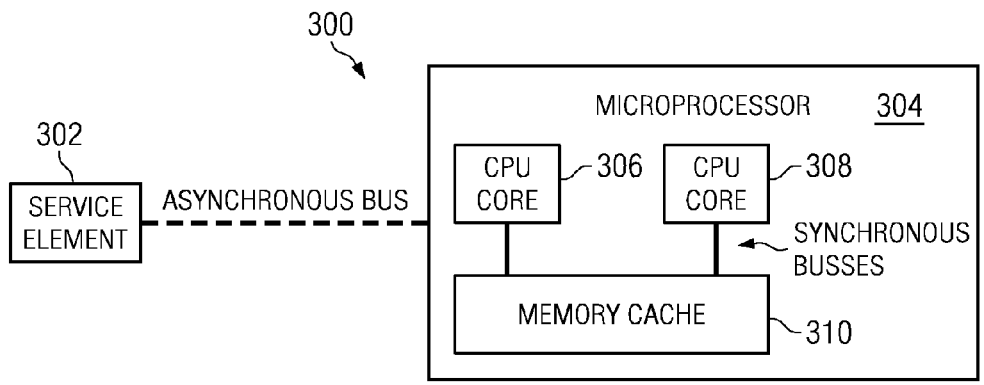
FIG. 3 is a block diagram of a processor system in which exemplary embodiments may be implemented.

Turning back to the figures, FIG. 3 is a block diagram of processor system in which exemplary embodiments may be implemented. System 300 comprises initializing mechanism 302 and microprocessor 304. Microprocessor may be implemented as a processor such as processor unit 104 in FIG. 1. Microprocessor 304 comprises two central processing cores, CPU cores 306 and 308, and memory cache 310. Memory cache 310 may be implemented as system memory 260 in FIG. 2. CPU cores 306 and 308 may be implemented as processor 210 in FIG. 2. Service element 302 is a microcontroller.

Service element 302 communicates with microprocessor 304 through an asynchronous bus. CPU cores 306 and 308 communicate with memory cache 310 through synchronous busses. It should be noted that while microprocessor 304 is depicted as having two processor cores, exemplary embodiments contemplate a microprocessor containing any number of processor cores, from one to many.

In an exemplary embodiment, the startup cycle begins by an initializing mechanism, such as service element 302 in FIG. 3, a second microprocessor, or a self-initializing microprocessor, applying power to a microprocessor, such as microprocessor 304 in FIG. 3 or processor 210 in FIG. 2. The initializing mechanism, scans the initial state, that is, initializes the configuration of the microprocessor, and sets a timer, such as timer 252 of FIG. 2, to a time that is long enough for the power supply to respond the drop in voltage due to startup. In the scan mode, the initializing mechanism that connects to a microprocessor via a JTAG port, sets set all the latches in all the elements in a processor core to a desired state or setting. The timer causes an interrupt unit, such as interrupt unit 250 of FIG. 2, to issue a system reset interrupt to a sequencer, such as sequencer unit 218 of FIG. 2, when the timer reaches zero. The initializing mechanism sends a clock start command to the microprocessor, causes the clocks on the microprocessor to start as well as the timer to start.

In order to fetch the first instruction after the power transient has settled, once the timer has reached a target value, an interrupt unit issues a system reset interrupt to the sequencer, which then causes the instruction fetch unit, such as instruction fetch unit 240 in FIG. 2, to fetch an instruction from instruction cache, such as instruction cache 214 in FIG. 2.

Figure 4:
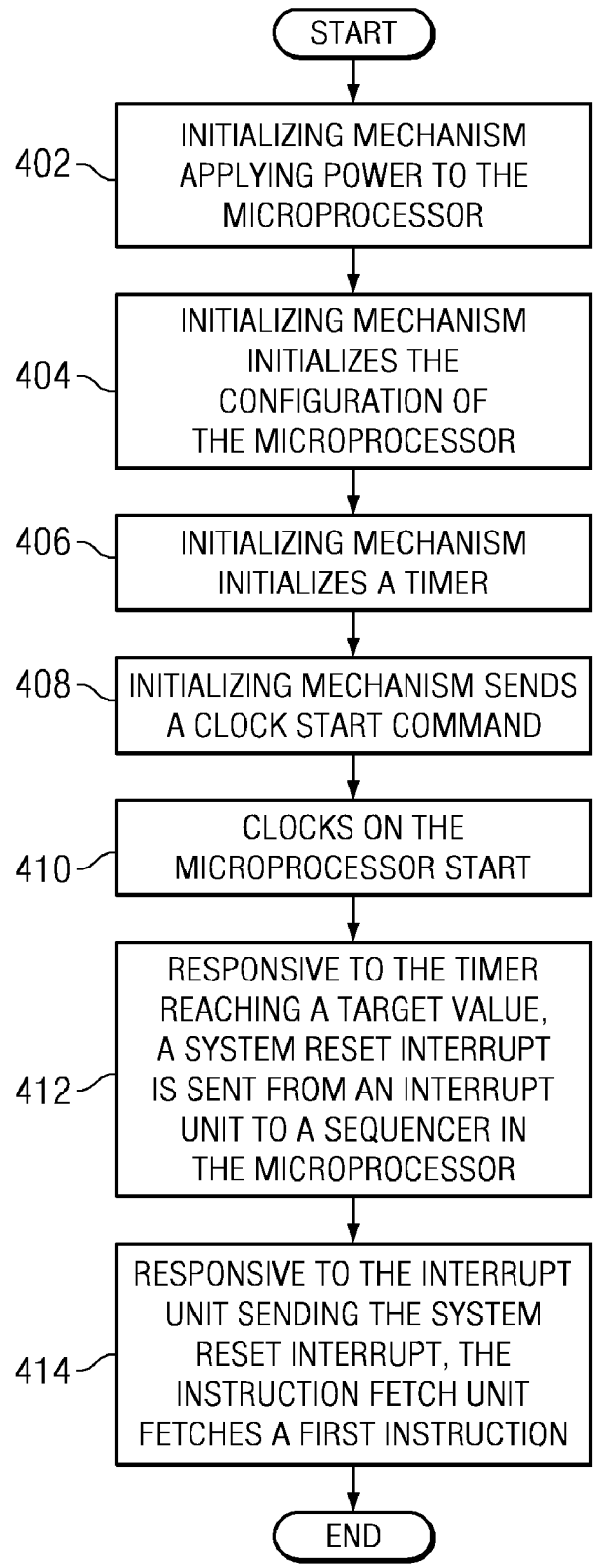
FIG. 4 is a flowchart illustrating the operation of a startup sequence in accordance with an exemplary embodiment.

FIG. 4 is a flowchart illustrating the operation of a startup sequence in accordance with an exemplary embodiment. The operation begins by an initializing mechanism applying power to the microprocessor (step 402). The initializing mechanism initializes the configuration of the microprocessor (step 404). The initializing mechanism initializes a timer (step 406). The timer sends a system reset interrupt when the timer reaches a target value. The initializing mechanism sends a clock start command (step 408). The clocks on the microprocessor start (step 410). These clocks are the clocks in all the elements of the microprocessor, the clocks that allow the latches to hold or maintain state. The starting of these clocks also starts the timer. Responsive to the timer reaching a target value, a system reset interrupt is sent from an interrupt unit to a sequencer in the microprocessor (step 412). Responsive to the interrupt unit sending the system reset interrupt, the instruction fetch unit fetches a first instruction (step 414) and the operation ends.

In an alternate embodiment, between the steps of the initializing mechanism initializing the configuration and initializing the timer, the initializing mechanism initializes an operating system, such as a test operating system into a memory cache. In this alternate embodiment, the microprocessor runs the test operating system out of the memory cache once instruction fetching begins.

In another alternate embodiment, a second microprocessor takes the place of and performs the task of the initializing mechanism. In another alternate embodiment, the instruction fetch unit only fetches instructions for a predetermined number of clock cycles. The predetermined number of clock cycles is programmable and a user may set this number.

Figure 5:
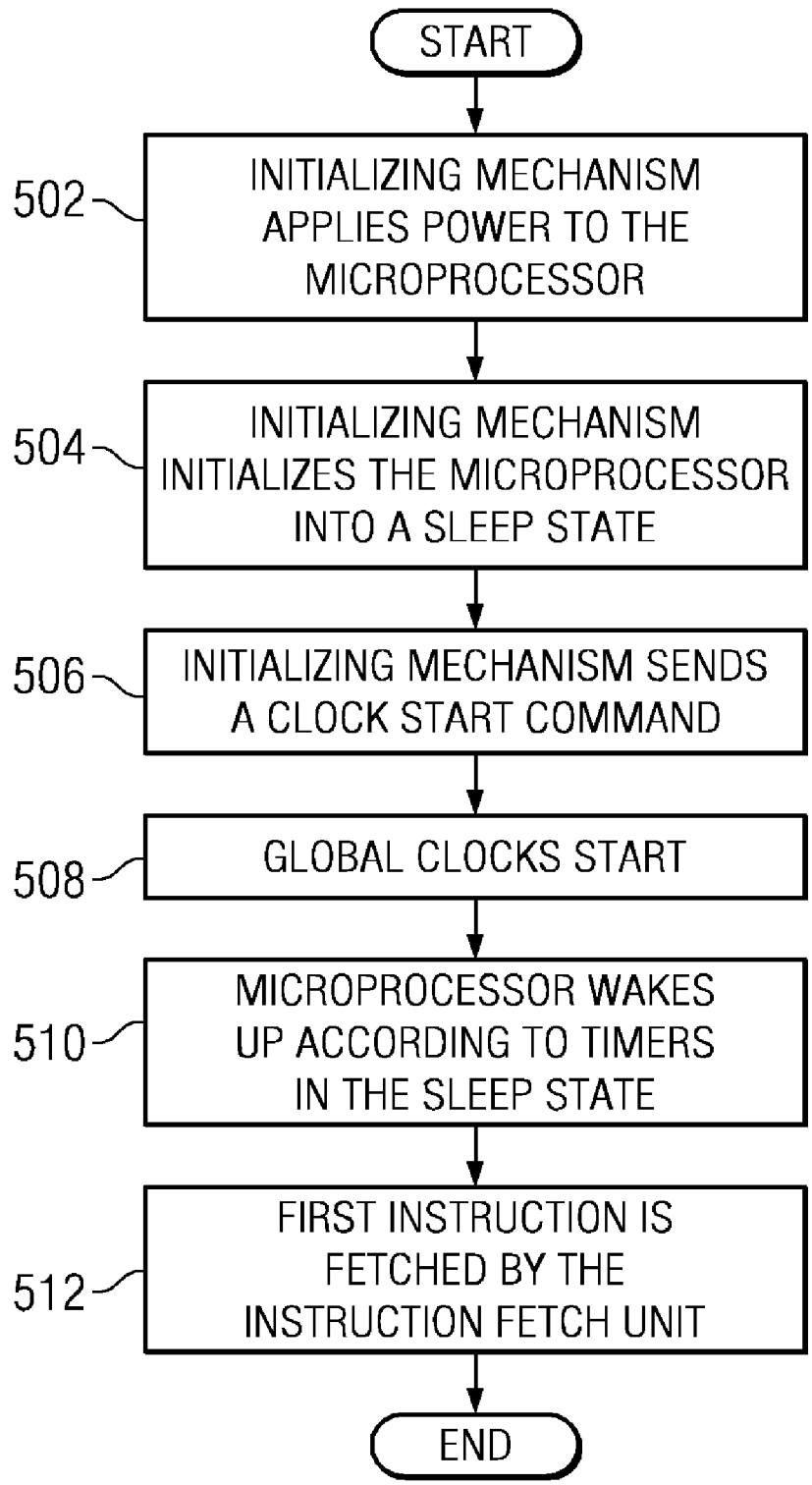
FIG. 5 is a flowchart illustrating the operation of a startup sequence in accordance with an alternate exemplary embodiment.

FIG. 5 is a flowchart illustrating the operation of an alternate startup sequence in accordance with an alternate exemplary embodiment. The operation begins by the initializing mechanism applying power to the microprocessor (step 502). The initializing mechanism initializes the microprocessor into a sleep state (step 504). In the scan mode, the initializing mechanism is able to set all the latches in all the elements in a processor core to a desired state or setting, including sleep states. The sleep state has a timer or other system reset interrupt used to wake up the processor. The initializing mechanism sends a clock start command (step 506). The global clocks start (step 508). Depending on the power save state, local clocks may be delayed. There are two types of sleep states. In one sleep state, the caches, such as data cache 216 and instruction cache 214 of FIG. 2, are "alive." That is, the clocks on these caches do not reset or turn off when the rest of the microprocessor goes to sleep. Rather, they stay on in order to stay synced with the rest of the system. In the second sleep mode, all caches are turned off. Thus, when the microprocessor wakes up from the second sleep state, usually the first thing that happens is to clear the caches. The microprocessor wakes up according to timers in the sleep state (step 510). A first instruction is fetched by the instruction fetch unit (step 512) and the operation ends.

In an alternate embodiment, after the initializing mechanism initializes the microprocessor into a sleep state, the initializing mechanism initializes an operating system, such as test operating system into a memory cache. In this alternate embodiment, the microprocessor runs the test operating system out of the memory cache once instruction fetching begins.

In an alternate embodiment, a second microprocessor is the initializing mechanism. In another alternate embodiment, the initializing mechanism is a service element. In an alternate embodiment, a self-initiating microprocessor is the initializing mechanism. In another alternate embodiment, the instruction fetch unit only fetches instructions for a predetermined number of clock cycles. The predetermined number of clock cycles is programmable and a user may set this number.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, exemplary embodiments provide for a start sequence that avoids power transients due to clock startup. Exemplary embodiments utilize a timer to delay the start of instruction fetching until the power supply has seen the drop in voltage due to clock startup and responded to the need.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to explain best the principles of the illustrative embodiments, the practical application, and to enable others of ordinary skill in the art to understand the illustrative embodiments for various embodiments with various modifications as are suited to the particular use contemplated.

What is claimed is:

1. A computer-implemented method for a startup cycle for a cycle deterministic start, the computer-implemented method comprising:
   applying power to a microprocessor by an initializing mechanism;
   initializing a configuration of the microprocessor by the initializing mechanism;
   initializing a timer by the initializing mechanism;
   sending a clock start command to the microprocessor by the initializing mechanism;
   starting the clocks on the microprocessor;
   responsive to the timer reaching a target value, sending a system reset interrupt from an interrupt unit;
   responsive to the interrupt unit sending the system reset interrupt, fetching a first instruction by an instruction fetch unit;
   determining the target value by the initializing mechanism; and
   wherein the target value is sufficient to allow a power supply to respond to a drop in voltage from starting the clocks on the microprocessor.

2. The computer-implemented method of claim 1, further comprising:
   initializing an operating system into a memory cache by the initializing mechanism; and
   running the operating system, by the microprocessor, out of the memory cache.

3. The computer-implemented method of claim 1, wherein the timer is part of the interrupt unit.

4. The computer-implemented method of claim 1, wherein the timer is located off the microprocessor.

5. The computer-implemented method of claim 1, further comprising:
   executing an operating system for a programmable number of clock cycles;
   responsive to the clocks reaching the programmable number of clock cycles, ceasing to execute the operating system.

6. The computer-implemented method of claim 1, wherein initializing mechanism is a self-initializing microprocessor.

7. The computer-implemented method of claim 1, wherein the initializing mechanism is a service element.

8. A system for a startup cycle for a cycle deterministic start, the system comprising:
   a microprocessor;
   a timer connected to the microprocessor;
   an interrupt unit on the microprocessor;
   an instruction fetch unit on the microprocessor;
   a power supply connected to the microprocessor;
   an initializing mechanism, wherein the initializing mechanism applies power to the microprocessor, initializes
   a configuration of the microprocessor, initializes the timer, and sends a clock start command to the microprocessor;
   clocks on the microprocessor, wherein the clocks start in response to receiving the clock start command;
   responsive to the timer reaching a target value, the interrupt unit sends a system reset interrupt;
   responsive to the interrupt unit sending the system reset interrupt, the instruction fetch unit fetches a first instruction;
   wherein the initializing mechanism determines the target value; and
   wherein the target value is sufficient to allow the power supply to respond to a drop in voltage from starting clocks on the microprocessor.

9. The system of claim 8, further comprising:
   a memory cache connected to the microprocessor, wherein the initializing mechanism initializes an operating system into the memory cache and wherein the microprocessor runs the operating system out of the memory cache.

10. The system of claim 8, wherein the timer is part of the interrupt unit.

11. The system of claim 8, wherein the timer is located off the microprocessor.

12. The system of claim 8, further comprising:
    executing an operating system for a programmable number of clock cycles;
    responsive to the clocks reaching the programmable number of clock cycles, ceasing to execute the operating system.

13. The system of claim 8, wherein the initializing mechanism is a self-initializing microprocessor.

14. The system of claim 8, further comprising:
    a JTAG port on the microprocessor;
    a service element connected to the microprocessor through the JTAG port, wherein the service element is the initializing mechanism.

* * * * *